United States Patent
Swerdlow

(10) Patent No.: US 11,463,492 B1
(45) Date of Patent: Oct. 4, 2022

(54) MODERATOR CONTROLS FOR BREAKOUT ROOMS

(71) Applicant: Zoom Video Communications, Inc., San Jose, CA (US)

(72) Inventor: Nick Swerdlow, Santa Clara, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/513,646

(22) Filed: Oct. 28, 2021

(51) Int. Cl.
*H04L 65/4038* (2022.01)
*H04L 12/18* (2006.01)
*H04L 65/1069* (2022.01)

(52) U.S. Cl.
CPC ...... *H04L 65/4038* (2013.01); *H04L 12/1822* (2013.01); *H04L 65/1069* (2013.01)

(58) Field of Classification Search
CPC ............. H04L 65/4038; H04L 12/1822; H04L 65/1069
See application file for complete search history.

(56) References Cited

U.S. PATENT DOCUMENTS

| | | | |
|---|---|---|---|
| 7,716,284 | B2 | 5/2010 | Andersen |
| 9,344,396 | B2 | 5/2016 | Geppert et al. |
| 9,420,108 | B1* | 8/2016 | Bostick ............... H04L 65/4015 |
| 9,525,711 | B2 | 12/2016 | Ackerman et al. |
| 11,088,971 | B2 | 8/2021 | Brody et al. |
| 2010/0251177 | A1* | 9/2010 | Geppert ................ H04L 51/046 709/206 |
| 2018/0268869 | A1* | 9/2018 | Nakagawa ....... H04N 21/41265 |
| 2018/0375676 | A1* | 12/2018 | Bader-Natal .......... G06F 3/0481 |
| 2021/0377062 | A1* | 12/2021 | Stevens ................. H04M 3/569 |
| 2021/0385263 | A1* | 12/2021 | Churchill .............. H04L 65/403 |
| 2022/0014711 | A1* | 1/2022 | Eskafi ................. H04L 65/4038 |

OTHER PUBLICATIONS

Microsoft Office Support, Use breakout rooms in Teams meetings, https://support.microsoft.com/en-us/office/use-breakout-rooms-in-teams-meetings-7de1f48a-da07-466c-a5ab-4ebace28e461., Oct. 5, 2021, 15 pages.
Managing Breakout Rooms—Zoom Help Center, https://support.zoom.us/hc/en-us/articles/206476313-Managing-breakout-rooms., Oct. 4, 2021, 4 pages.
Use breakout rooms in Google Meet—Google Meet Help., https://support.google.com/meet/answer/1009500?hl=en., Oct. 5, 2021, 3 pages.

* cited by examiner

*Primary Examiner* — John A Follansbee
*Assistant Examiner* — Raqiul A Choudhury
(74) *Attorney, Agent, or Firm* — Young Basile Hanlon & MacFarlane, P.C.

(57) ABSTRACT

A meeting host or moderator can control communications among participants in virtual breakout rooms without requiring the host to join a breakout room as a participant. The host can run conferencing software to instantiate a meeting room and breakout rooms associated with the meeting room. The host can control communications in the breakout rooms, such as by transmitting and/or receiving content through one or more channels established by the conferencing software. The host can transmit and/or receive content such as a real time audio stream, a transcription of the audio stream, a screen or window being shared, chat messages, and the like, without joining the breakout room.

22 Claims, 11 Drawing Sheets

MODERATOR CONTROLS FOR BREAKOUT ROOMS

FIELD

This disclosure relates to moderator or host controls for breakout rooms, such as those implemented by conferencing software.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
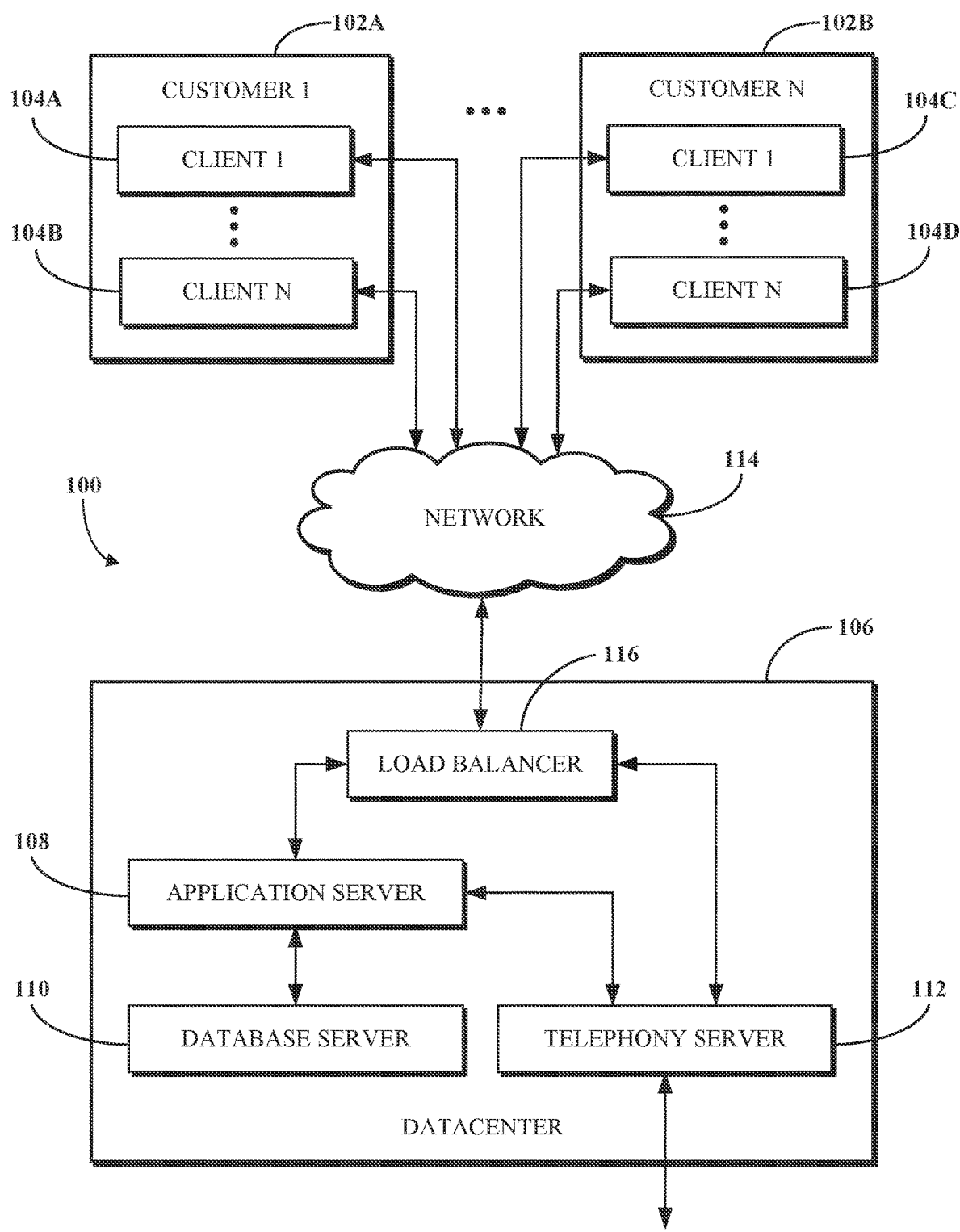
FIG. 1 is a block diagram of an example of an electronic computing and communications system.

A "breakout room" is a virtual meeting room that allows participants of a main meeting to temporarily leave the main meeting and join a side meeting (e.g., breakout) associated with the main meeting. Thus, breakout rooms are frequently used to split a main meeting into multiple breakout meetings (e.g., breakout rooms). A meeting host or moderator ("host") can choose to split participants of the main meeting into these separate breakout rooms automatically or manually, or they can allow participants to select and enter breakout rooms on their own. The host can configure the number of breakout rooms and can switch between joining breakout rooms at any time. Once breakout rooms have been started, assigned participants are typically asked to join a breakout room. The host that launched the breakout rooms normally stays in the main meeting until leaving the main meeting and joining a breakout room manually. Conferencing software thus enables breakout rooms as multiple meetings within a meeting, each managed by the host. Conferencing software may be available as a standalone software product or it may be integrated within a software platform, such as a unified communications as a service (UCaaS) platform.

Typically, when participants go into a breakout room, the host does not know what is happening in the breakout room unless the host also joins the breakout room. However, the host joining a breakout room often stunts the conversation due to participants feeling less open to share when the host is present. For example, in a school environment when students are in discussion in a breakout room, the students may feel less open to share in discussion when a teacher joins the breakout room. This may also occur in a business environment among employees and a supervisor, or in a club environment among members and a leader.

Thus, breakout rooms conventionally lack the ability to allow a host to monitor communication among participants in breakout rooms without the host also joining the breakout room and potentially stunting the conversation (i.e., without jumping in). Breakout rooms also lack the ability to allow a host to control communications in breakout rooms, such as controlling content displayed to a screen or window being shared among participants, without the host joining the breakout room. Breakout rooms also lack the ability to allow a host to dynamically control communications in breakout rooms, such as limiting an amount of time in which content is displayed to a screen or window being shared among participants in a breakout room, without the host joining the breakout room.

Implementations of this disclosure address problems such as these by allowing a host to control communications in breakout rooms without requiring the host to join a breakout room as an additional participant. Generally, the host can run, or cause to be run, conferencing software to instantiate a meeting room and one or more breakout rooms associated with the meeting room. The meeting room and breakout rooms normally limit communication to participants in the corresponding rooms, i.e., limit communication to participants that join (e.g., moving by their own action or as a result of a host instruction) the room. As used herein, "join" in the context of a room refers to a client device connecting to a room and thus a user of that client device being in the room such that the user is indicated as being a participant in the room to other users that are also participants in the room. After joining a room, a user may leave the room so that they are no longer a participant in the room, and after leaving the room, the user may in some cases join another room. While the host can control communications in breakout rooms without joining a breakout room, the host can also join a breakout room to become a participant in the room, such that the host is indicated as being a participant to other participants in the room. Additionally, when in a breakout room, the host can continue to control communication in that breakout room and in other breakout rooms.

In some implementations, the host can control communications in breakout rooms without joining a breakout room by receiving content from breakout rooms, such as one or more of a real time audio stream comprising communication among the participants, a real time transcription of the audio stream, a screen or window being shared which displays a picture, page, slide, video, or other media, chat messages, and the like. Additionally, in some implementations, the host can control communications in breakout rooms without joining a breakout room by transmitting content, e.g., forcing content, to breakout rooms, such as broadcasting audio and/or video communications or messages to participants, transmitting a picture, page, slide, video, or other media to a screen or window being shared by participants, transmitting chat messages, and the like. In some implementations, the host can dynamically control communications in breakout rooms, such as by limiting an amount of time in which content is displayed to a screen or window being shared. Accordingly, the host can determine whether participants in breakout rooms are on task or in need of assistance without stunting the conversation by joining as a participant. The host can also guide discussions in breakout rooms by selectively controlling the content in breakout rooms, individually or in groups, without joining a breakout room as a participant.

Implementations disclosed herein describe control of communications in virtual meeting rooms, such as breakout rooms. However, such disclosure is in no way a representation that all types of control of communications may be proper in all circumstances. To the contrary, control of communications should be limited to circumstances in which the control is authorized by applicable laws, policies, procedures, and customs. Generally, hosts may receive relevant permissions from participants, and participants may give permissions to their host, before hosts control communications in meeting rooms. In some implementations, permission may be obtained, for example, by the host causing a notification or pop-up window to display to the user interface (e.g., screen or window) of each participant's device for the participant to click their acknowledgment and acceptance.

To describe some implementations in greater detail, reference is first made to examples of hardware and software structures used to implement a system providing moderator controls for breakout rooms. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
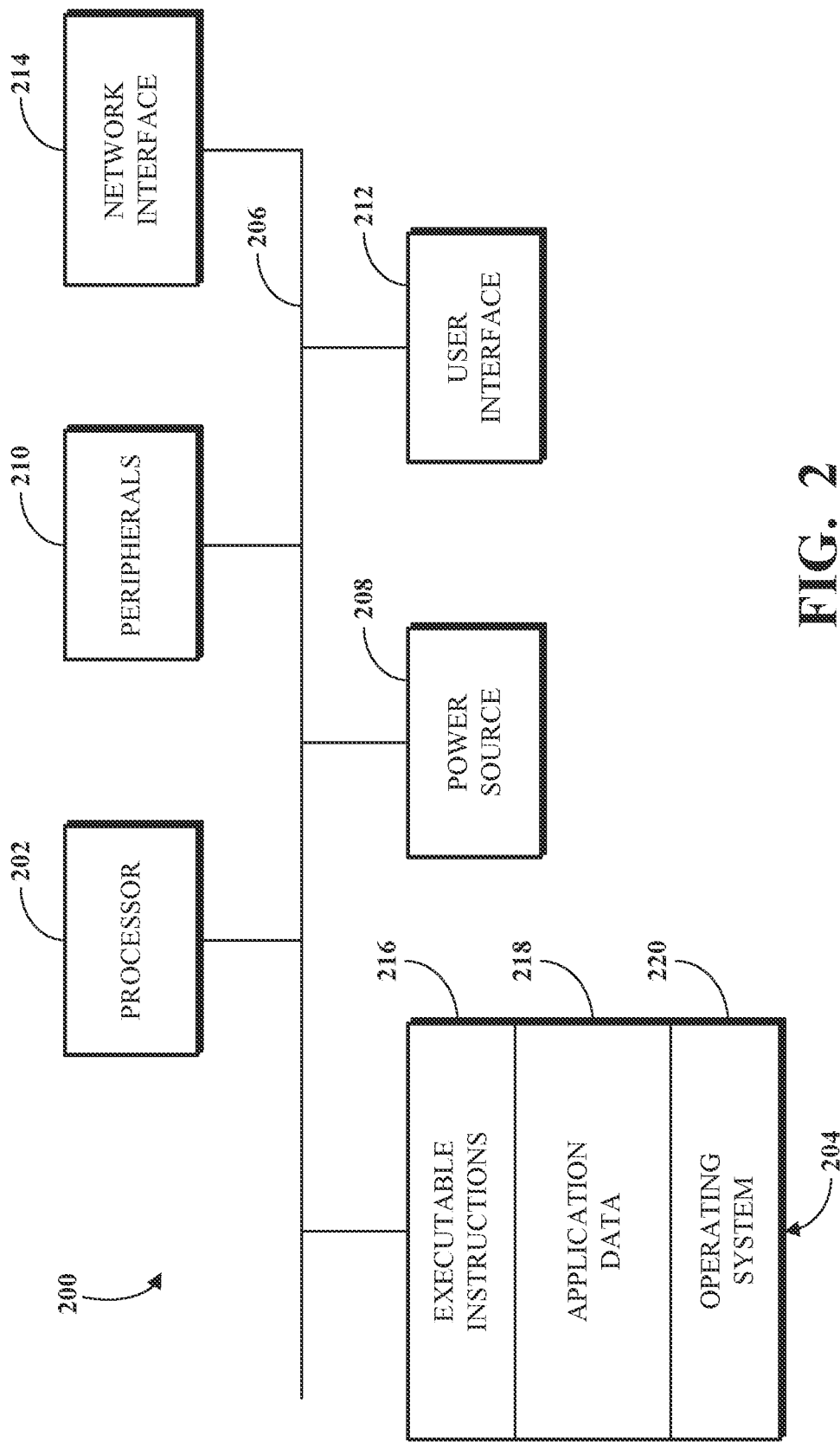
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
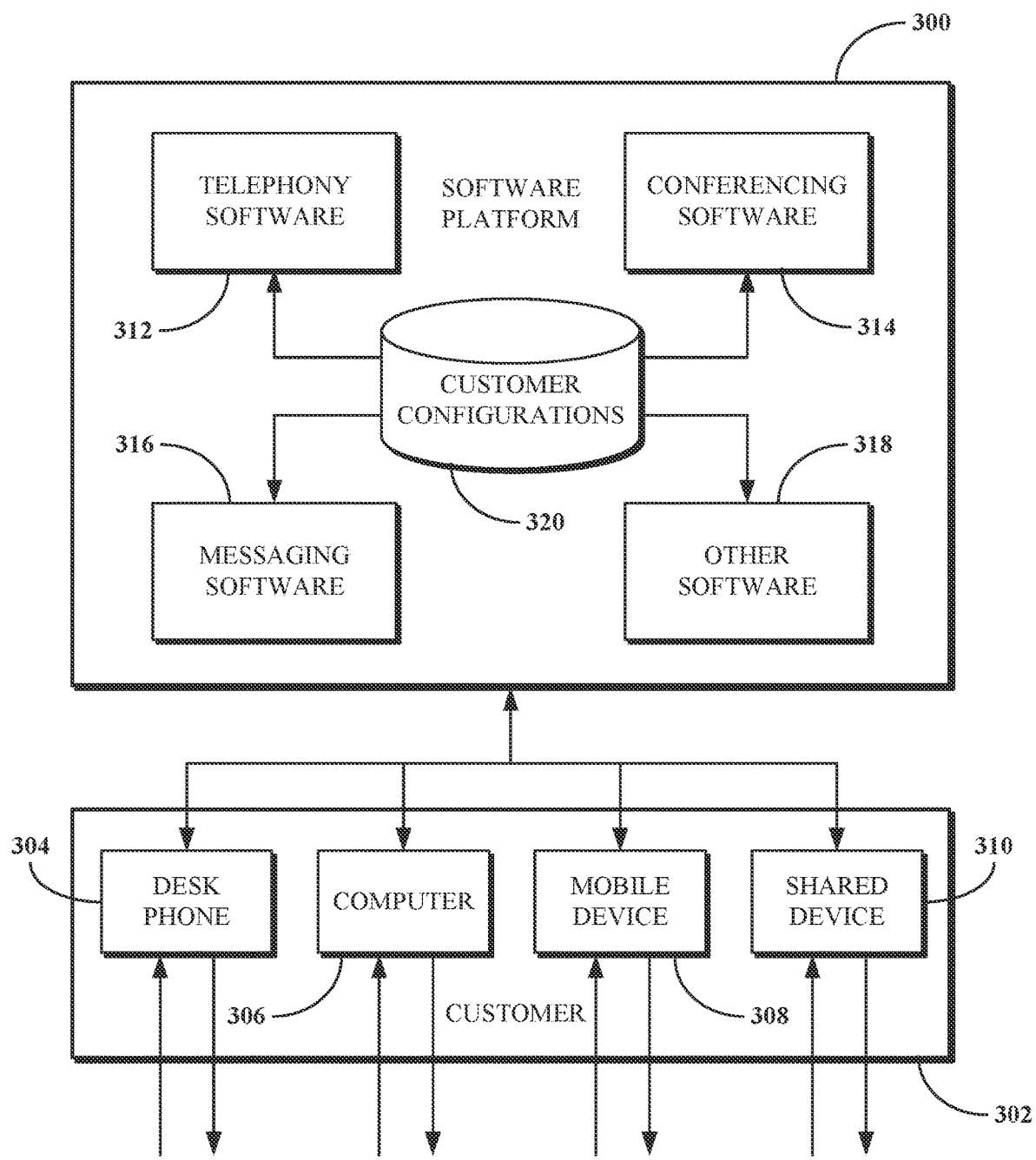
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients— a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include control software allowing a meeting host or moderator to control communications among participants in breakout rooms without the host joining a breakout room as a participant. In some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
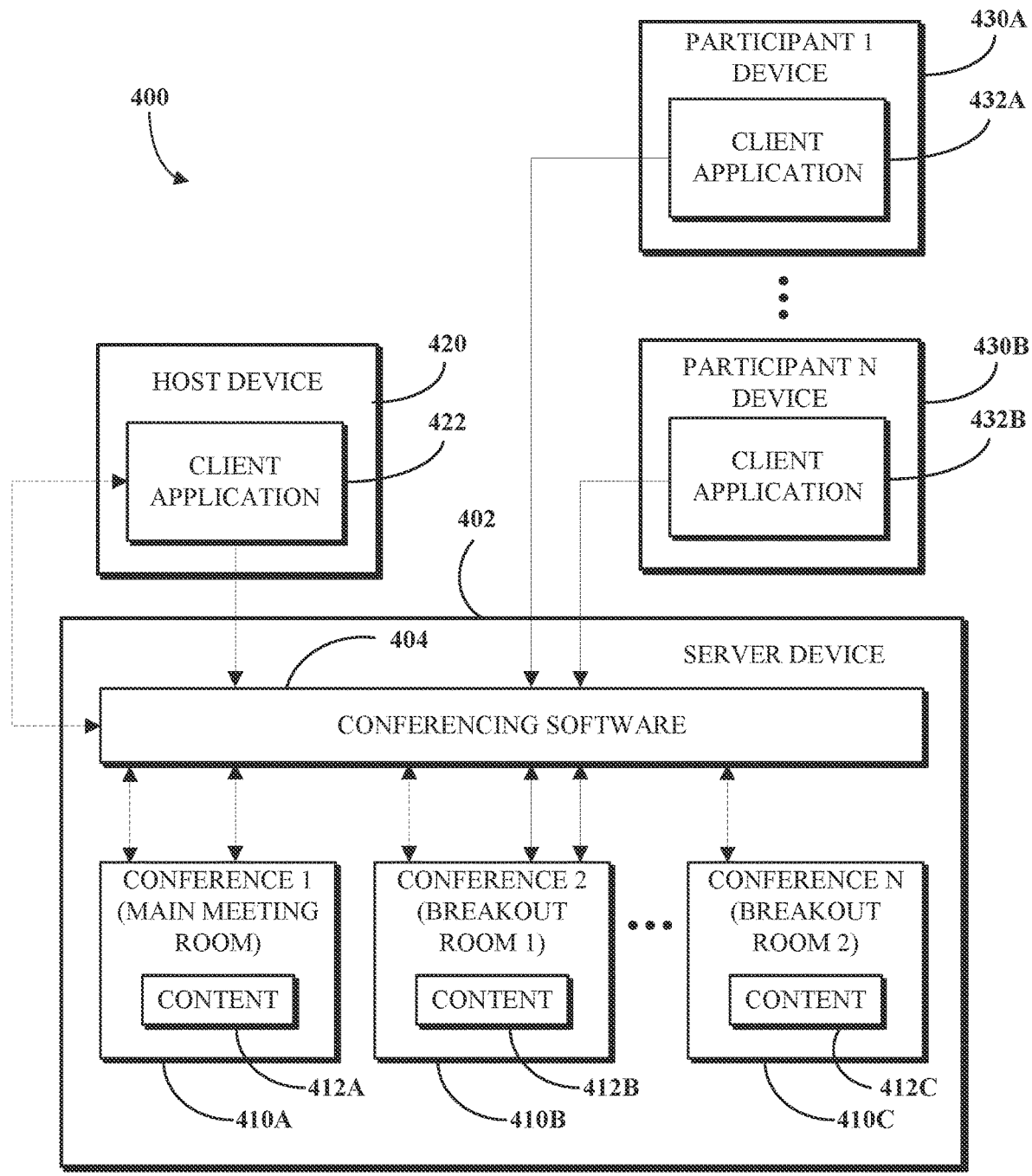
FIG. 4 is a block diagram of devices used with a system providing moderator controls for breakout rooms.

FIG. 4 is a block diagram of devices used with a system providing moderator controls for breakout rooms. In particular, a server device 402, which may, for example, be a server at the datacenter 106 shown in FIG. 1, runs software including conferencing software 404. The conferencing software 404, which may, for example, be the conferencing software 314 shown in FIG. 3, is used to instantiate and control one or more conferences, such as conferences 410A through 410C, as configured by a host. Each instantiated conference creates a meeting room allowing communication between participants that join the meeting room. For example, the first instantiated conference, such as conference 410A, may be a "main meeting room" for the host and participants to initially join, and subsequently instantiated conferences, such as conferences 410B and 410C, may be "breakout rooms" associated with the main meeting room. Each instantiated conference includes a session identifier or address that allows the conferencing software 404 to organize the rooms, individually or in groups, and to associate or link the breakout rooms as sub-rooms to the main meeting room.

A host device 420, which may, for example, be a client device such as one of the clients 104A through 104D shown in FIG. 1, may be operated by a host to run a client application 422 executing on the host device 420. As used herein, a "host" refers to a user having an account and/or credentials sufficient to allow the user to establish and control one or more meetings through the conferencing software 404 and to allow one or more other users ("participants") to join the one or more meetings. A "participant" refers to a user having an account and/or credentials sufficient to allow the user to access the conferencing software 404 and join a meeting to participate in audio and/or video communication and/or other media sharing with other participants of the meeting. Participants are generally aware of other participants present in a meeting by receiving an indication of which participants are in the meeting, such as display of a list of participants or a group of tiles associated with each participant in the meeting. While the host may join a meeting as a participant, the host also has control over each of the meetings without joining as a participant, such as by opening and closing meetings, moving participants between breakout rooms and/or the main meeting room, and/or controlling communications among participants in meetings.

The client application 422, executing on the host device 420, comprises software which communicates with the conferencing software 404 to enable the host to participate in conferences implemented by the conferencing software 404. For example, as illustrated by a solid line between the client application 422 and the conferencing software 404, the host may participate in conferences implemented by the conferencing software 404 as a participant. Additionally, with host credentials, the client application 422 enables the user to control the conferencing software 404 and conferences implemented by the conferencing software 404. For example, as illustrated by a dash line between the client application 422 and the conferencing software 404, and by additional dash lines between the conferencing software 404 and conferences 410A through 410C, the host may instantiate the conferences, control which participants join which conferences, and control communications in the conferences.

Additionally, one or more participant devices, such as participant devices 430A and 430B, which may, for example, be client devices such as the clients 104A through 104D shown in FIG. 1, may be operated by participants to run client applications executing on the participant devices. For example, a participant device 430A may be operated by "Participant 1" to run client application 432A, and a participant device 430B may be operated by "Participant N" to run client application 432B. Like the client application 422, the client applications 432A and 432B comprise software which communicate with the conferencing software 404 to enable the participant to join a conference implemented by the conferencing software 404. For example, as illustrated by a solid line between the client application 432A and the conferencing software 404, Participant 1 may participate in a conference implemented by the conferencing software 404 as a participant. Additionally, as illustrated by a solid line between the client application 432B and the conferencing software 404, Participant N may participate in a conference implemented by the conferencing software 404 as another participant.

In operation, the host device 420 controls the conferencing software 404 to instantiate the conferences, such as conference 410A as a main meeting room and conferences 410B and 410C as breakout rooms associated with the main meeting room. The host device 420 then controls the conferencing software 404 to allow participants to join meeting rooms. Typically, the host will initially join all participants to the main meeting room as "meeting participants." For example, as illustrated by a solid line between the conferencing software 404 and conference 410A, the host device 420 controls the conferencing software 404 in joining the host device 420 to the main meeting room, such as by establishing a communication channel, through the conferencing software 404, from the host device 420 to conference 410A. Participant 1 and Participant N may be similarly joined to the main meeting room. Additionally, the host may divide the participants into breakout rooms, automatically or manually, as "breakout participants." For example, as illustrated by solid lines between the conferencing software 404 and conference 410B, the host device 420 may control the conferencing software 404 to join Participant 1 and Participant N to breakout room 1, such as by establishing communication channels, through the conferencing software 404, from participant devices 430A and 430B to conference 410A.

With participants assigned to breakout rooms, the participants may proceed to communicate with one another in the breakout room. For example, Participant 1 and Participant N may communicate with one another in breakout room 1 without communication from other participants in other breakout rooms. Communication in a breakout room may comprise sharing content, through the breakout room, that is output to a user interface of each participant's device, such as an audio stream comprising communication among the participants; a screen or window displaying a picture, page, slide, video, or other media; chat messages; and the like.

During meetings, the host can control communications in breakout rooms without joining a breakout room. Before controlling the communications, the host can cause a notification or pop-up window to display to the user interface (e.g., screen or window) of each participant's device for the participant to click their acknowledgment and acceptance. Following such acceptance, the host can control communications in breakout rooms by transmitting and/or receiving content through channels, or signaling paths, established by the conferencing software 404. Channels may comprise network connections or pathways routing communications between the host device 420 and participant devices (e.g., participant devices 430A and 430B), such as through the server device 402, based on network addresses for each of the devices. The channels may be established, and communication routed, via the conferencing software 404. For example, the host device 420 can control communications in conferences 410A through 410C by transmitting and/or receiving content 412A through 412C through channels established by the conferencing software 404 between the host device 420 and conferences 410A through 410C, respectively. The host device 420 can similarly control communications in breakout rooms, without joining a breakout room, by receiving content from breakout rooms, such as a real time media audio stream comprising communication among the participants; a real time transcription of the audio stream; a screen or window being shared which displays a picture, page, slide, video, or other media; chat messages; and the like. Content received by the host from a breakout room, such as content 412B received by host device 420 from conference 410B, may be output to a user interface of the host device 420, which may include a virtual reality display.

Additionally, in some implementations, the host device 420 can control communications in breakout rooms, without joining a breakout room, by transmitting content e.g., forcing content, to breakout rooms, such as broadcasting audio and/or video communications or messages to participants; transmitting a picture, page, slide, video, or other media to a screen or window being shared by participants; transmitting chat messages; and the like. In some implementations, the host device 420 can dynamically control communications in breakout rooms, such as by limiting an amount of time in which content is displayed to a screen or window being shared. For example, the amount of time may be limited by a timer configured by the host device 420, upon expiration of which the content is changed or removed. Content transmitted by the host to a breakout room, such as content 412B transmitted by host device 420 to conference 410B, may be output to user interfaces of participant devices in the breakout room, such as user interfaces of participant devices 430A and 430B, which may include a virtual reality display.

Figure 5:
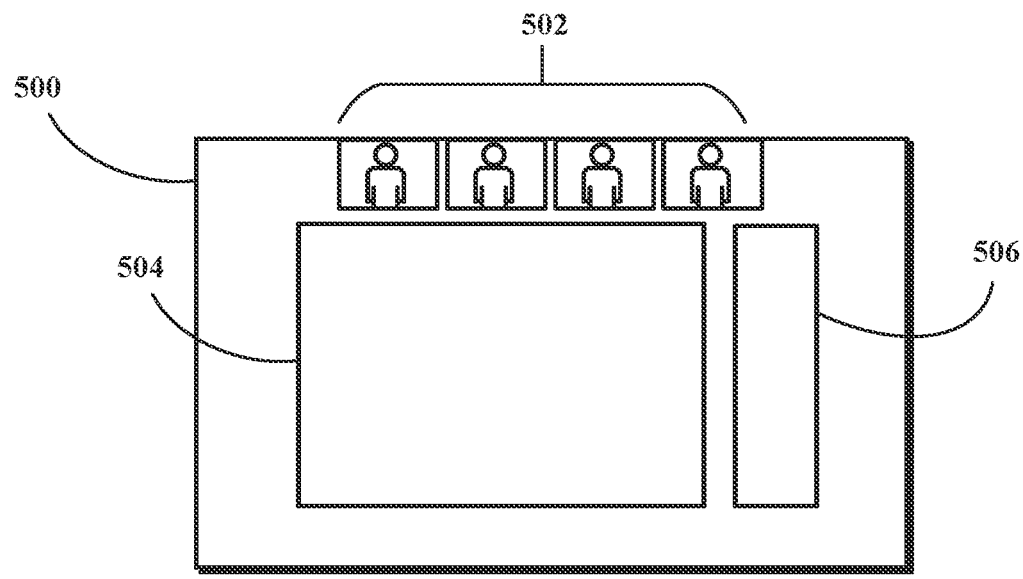
FIG. 5 is an illustration of a user interface corresponding to a client device of a participant in which a host controls communication in a breakout room without joining the breakout room.

FIG. 5 is an illustration of a user interface 500 of a client device corresponding to a participant in a breakout room, which may, for example, be participant devices such as the participant devices 430A or 430B shown in FIG. 4. The user interface 500 represents a state in which a host controls communication in the participant's breakout room without joining the breakout room. The user interface 500 displays participant tiles 502 corresponding to each participant present in the breakout room. The participant tiles 502 provide a visual indication of which participants are in the breakout room. Since the host has not joined the breakout room as a participant, the host will not appear among the participant tiles 502. The user interface 500 also displays a screen or window 504 and a communication box 506 for sharing content in the breakout room.

Participants in the breakout room may communicate with one another by sharing content, such as the content 412B shown in FIG. 4, including an audio stream comprising communication among the participants; displaying a picture, page, slide, video, or other media to the screen or window 504; exchanging chat messages via the communication box 506; and the like. During the meeting, the host can control communication in the breakout room without joining the breakout room by transmitting and/or receiving content. For example, the host can receive content from the breakout room, such as a real time media audio stream comprising communication among the participants, a real time transcription of the audio stream, the screen or window 504 being shared, and/or chat messages from the communication box 506. In some implementations, participants can initiate an audio communication back to the host, via the communication box 506, analogous to an intercom system, without the host being in the breakout room. This may allow a participant in a breakout room of the one or more breakout rooms to initiate content communication with the host. Additionally, the host can broadcast audio and/or video communications or messages to the participants; transmit a picture, page, slide, video, or other media to the screen or window 504 being shared; and/or transmit chat messages to the communication box 506 being shared. Accordingly, the host can control the communication in the breakout room without being a participant.

Figure 6:
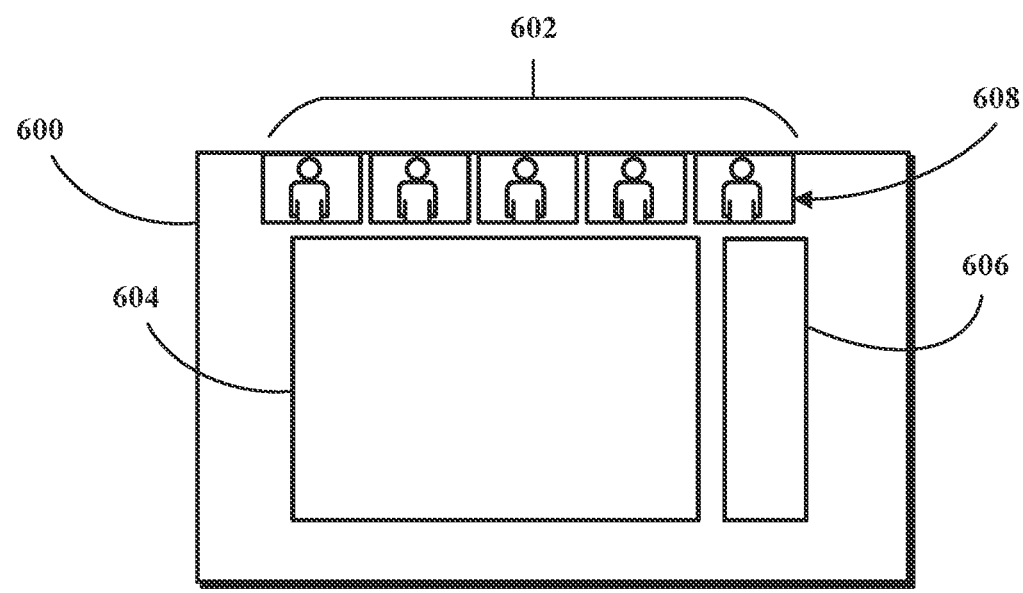
FIG. 6 is an illustration of a user interface of a client device corresponding to a participant in which a host controls communication in a breakout room after joining the breakout room.

FIG. 6 is an illustration of a user interface 600 of a client device corresponding to a participant in a breakout room, which may, for example, be participant devices such as the participant devices 430A or 430B shown in FIG. 4. The user interface 600 represents a state in which a host controls communication in the participant's breakout room after joining the breakout room. The user interface 600 displays participant tiles 602 corresponding to each participant present in the breakout room. The participant tiles 602 provide a visual indication to the participant of each participant that is currently in the breakout room. Since the host has joined the breakout room as a participant, the host will appear among the participant tiles 602 as an additional tile 608. The user interface 600 also displays a screen or window 604 and a communication box 606 for sharing content in the breakout room.

Participants in the breakout room, including the host, may communicate with one another by sharing content, such as the content 412B shown in FIG. 4, including an audio stream comprising communication among the participants; displaying a picture, page, slide, video, or other media to the screen or window 504; exchanging chat messages via the communication box 506; and the like. During the meeting, the host can communicate in the breakout room as another participant, the host can control communication in the breakout room over other participants, and the host can control communications in other breakout rooms. Accordingly, the host can jump into a breakout room as a participant to guide the breakout room while continuing to monitor the progress of other breakout rooms.

Figure 7:
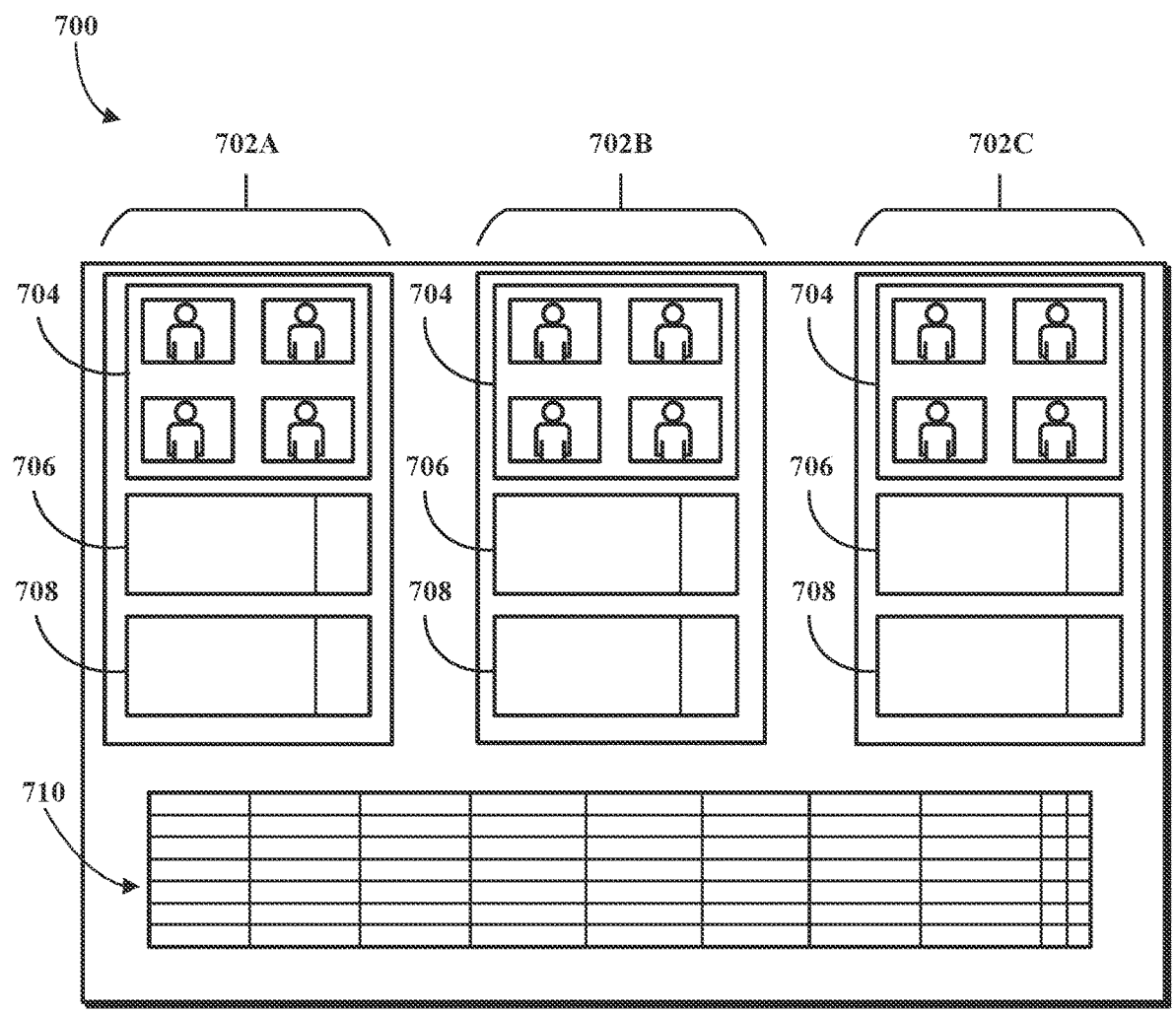
FIG. 7 is an illustration of a user interface corresponding to a client device of a host in which the host controls communications in breakout rooms.

FIG. 7 is an illustration of a user interface 700 of a client device corresponding to a host, which may, for example, be a host device such as the host device 420 shown in FIG. 4. The user interface 700 allows a host to control communications in multiple breakout rooms with greater efficiency. The user interface 700 displays multiple room tiles, each corresponding to a breakout room, such as room tiles 702A through 702C corresponding to conferences 412A through 412C shown in FIG. 4. Each room tile includes participant tiles 704 corresponding to participants in the breakout room, a screen or window and communication box 706 corresponding to a screen or window and communication box being shared in the breakout room, and a screen or window and communication box 708 for the host to select content and prepare communications and messages to transmit to the screen or window and/or communication box in the breakout room. The user interface 700 also displays a table 710 which lists the meeting room and breakout rooms by session identifier or address, each of the participants, and assignments of participants to breakout rooms. The table 710 conveniently allows the host to join and leave breakout rooms, move participants from one breakout room to another, instantiate new breakout rooms, and remove old breakout rooms. Accordingly, the host may dynamically optimize the number of breakout rooms, the number of participants in breakout rooms, the assignment of participants to breakout rooms, and/or the location of participants in breakout rooms, while in session, without joining a breakout room.

Figure 8:
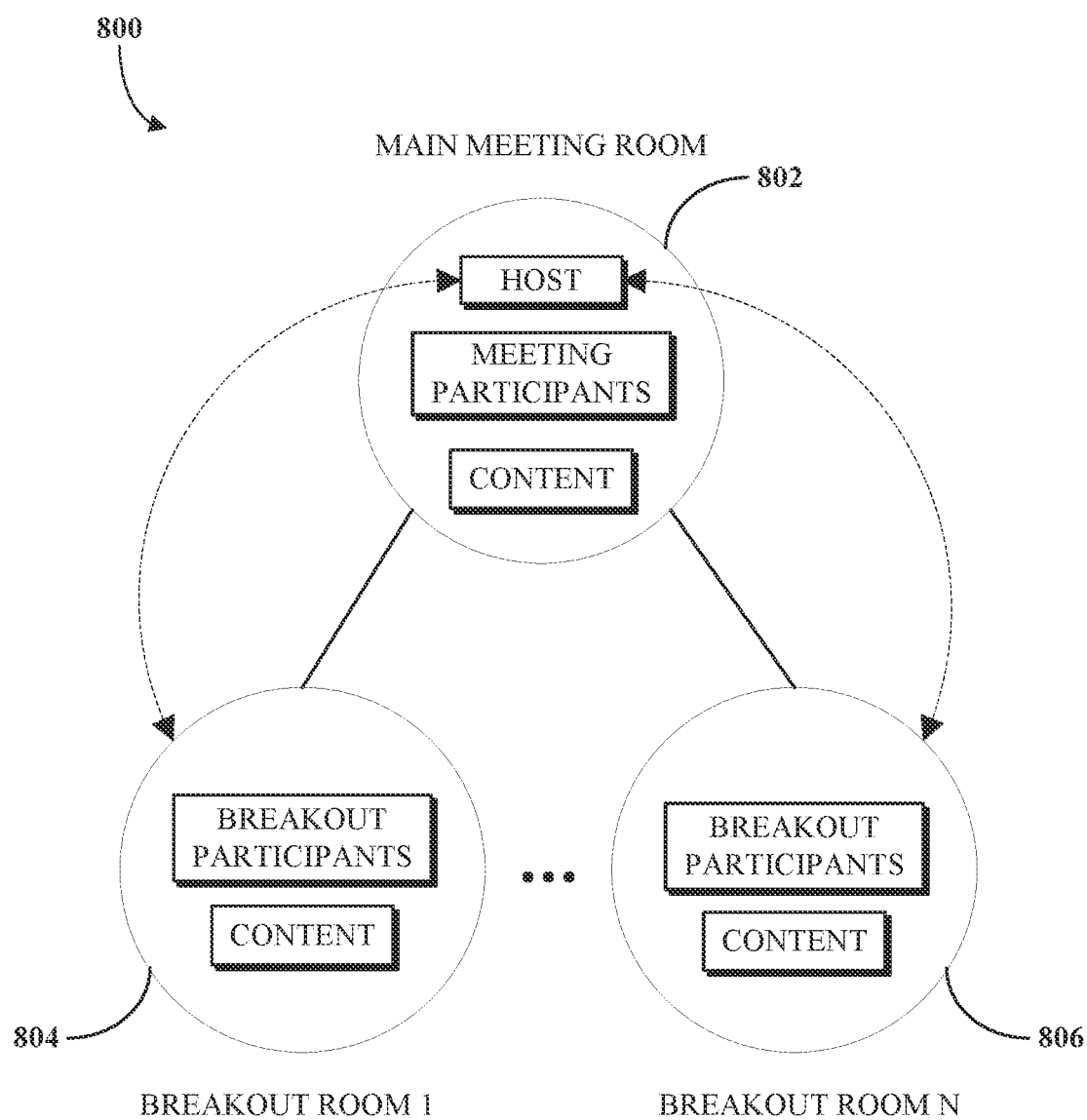
FIG. 8 is a block diagram of an example of a system in which a host individually controls breakout rooms.

FIG. 8 is a block diagram of an example of a system 800 in which a host individually controls breakout rooms. The system 800 can be executed using computing devices, such as the systems, hardware, and software described with respect to FIGS. 1-7. In the system 800, a host can instantiate a main meeting room and multiple breakout rooms associated with the main meeting room, such as a main meeting room 802 and breakout rooms 804 through 806. Each instantiated room includes a session identifier or address that allows conferencing software, such as the conferencing software 404 shown in FIG. 4, to organize the rooms, individually or in groups, and to associate or link the breakout rooms as sub-rooms to the main meeting room. Initially, the host can join the main meeting room and admit participants to join the main meeting room as "meeting participants." For example, the meeting participants may comprise a teacher and students in a virtual classroom, or a supervisor and employees in a virtual conference room. The meeting participants, including the host, may communicate with one another and share content in the main meeting room with the host controlling the meeting.

Additionally, "breakout participants" may be assigned to one or more of the breakout rooms from among the meeting participants in the meeting room. Breakout participants may be assigned to breakout rooms automatically (e.g., randomly) or manually (e.g., based on host selection) or may be allowed to select and enter breakout rooms on their own. In each breakout room, each breakout participant receives an indication, such as through a user interface of the breakout participant's client device, of other breakout participants in the breakout room. Further, each breakout participant can communicate and share content with other breakout participants in the breakout room. As shown by dashed connections, the host, without joining a breakout room, can control communications in individual breakout rooms, such as by transmitting content to breakout rooms and/or receiving content from breakout rooms through conferencing software, such as the conferencing software 404 shown in FIG. 4. Communication may be controlled, for example, through channels, or signaling paths, comprising network connections or pathways routing the communications between the host device and participant devices, such as through a server device, based on network addresses for each of the devices. The channels may be established, and communication routed, via the conferencing software. The host can move participants from one breakout room to another, instantiate new breakout rooms, and remove old breakout rooms. The host can also control communications in breakout rooms from the main meeting room, from any of the breakout rooms, or without joining any room at all. Accordingly, the host can guide discussions in individual breakout rooms without stunting conversations by joining as a participant.

Figure 9:
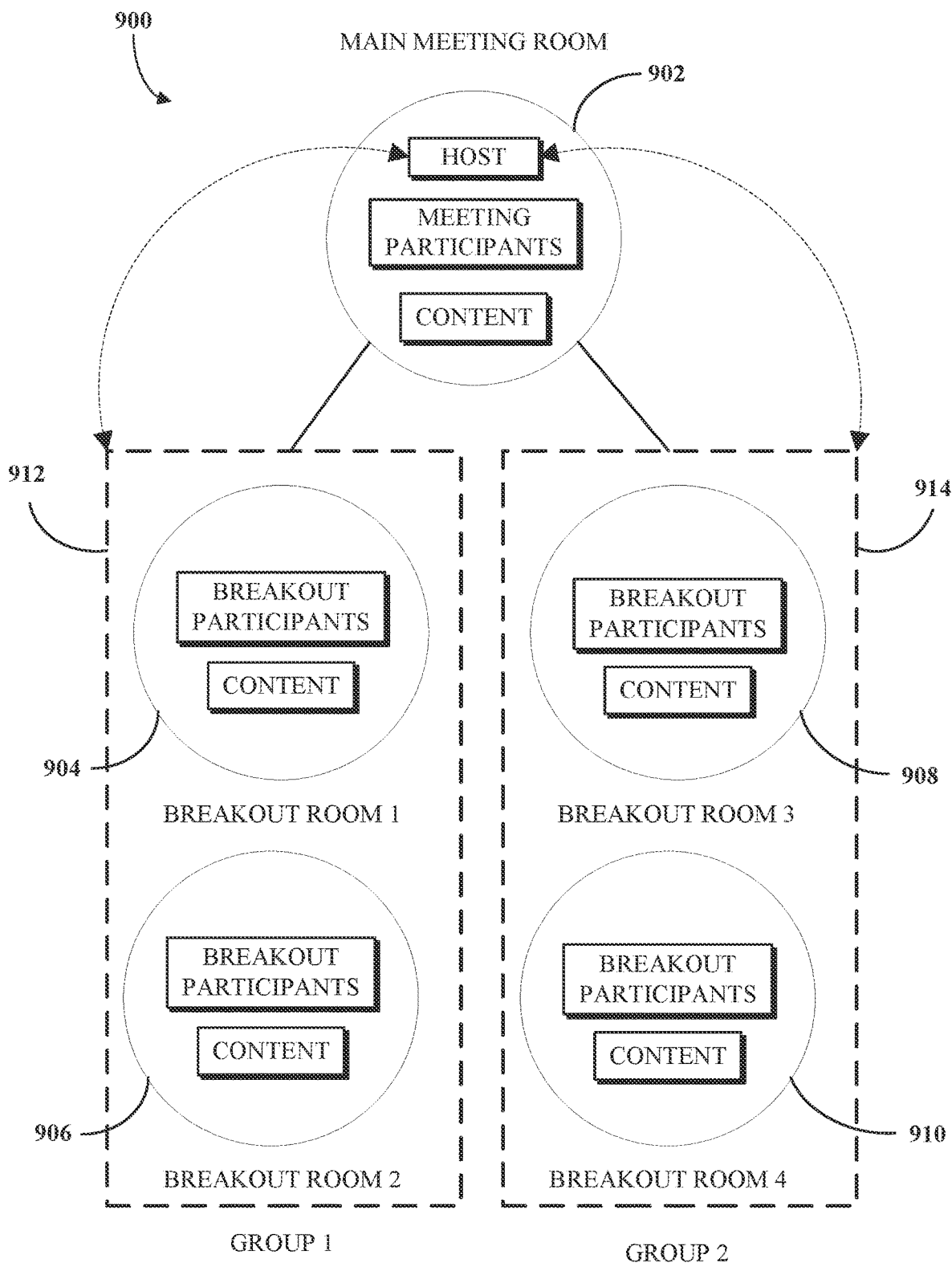
FIG. 9 is a block diagram of an example of a system in which a host controls breakout rooms in groups.

FIG. 9 is a block diagram of an example of a system 900 in which a host controls breakout rooms in groups. The system 900 can be executed using computing devices, such as the systems, hardware, and software described with respect to FIGS. 1-7. In the system 900, a host can instantiate a main meeting room and multiple breakout rooms associated with the main meeting room, such as a main meeting room 902 and breakout rooms 904, 906, 908, and 910. Each instantiated room includes a session identifier or address that allows conferencing software, such as the conferencing software 404 shown in FIG. 4, to associate or link the breakout rooms as sub-rooms to the main meeting room.

Additionally, the host can assign one or more breakout rooms to one or more groups, such as breakout rooms 904 and 906 assigned to a first group 912, and breakout rooms 908 and 910 assigned to a second group 914. Each group includes a group identifier or address that allows the conferencing software to organize the rooms into groups and to associate or link the groups to the main meeting room. Accordingly, the host can manage breakout rooms differently from one another in groups or subsets. As shown by dashed connections, the host, without joining a breakout room, can control communications for multiple breakout rooms simultaneously in groups through conferencing software, such as the conferencing software 404 shown in FIG. 4. For example, the host can transmit a first content, e.g., a picture, page, slide, video, or other media, to a screen or window being shared in breakout rooms 904 and 906 simultaneously in the first group 912. Additionally, while transmitting the first content to the first group 912, the host can transmit a second content, e.g., audio and/or video communications or messages to participants, to breakout rooms 908 and 910 simultaneously in the second group 912. Such communications may be transmitted, for example, through channels, or signaling paths, comprising network connections or pathways routing the communications between the host device and participant devices, such as through a server device, based on network addresses for each of the devices. The channels may be established, and communication routed, via the conferencing software. Accordingly, the host can efficiently guide discussions in groups of breakout rooms, tailored to the needs of each group, without requiring the host to join a particular breakout room.

Figure 10:
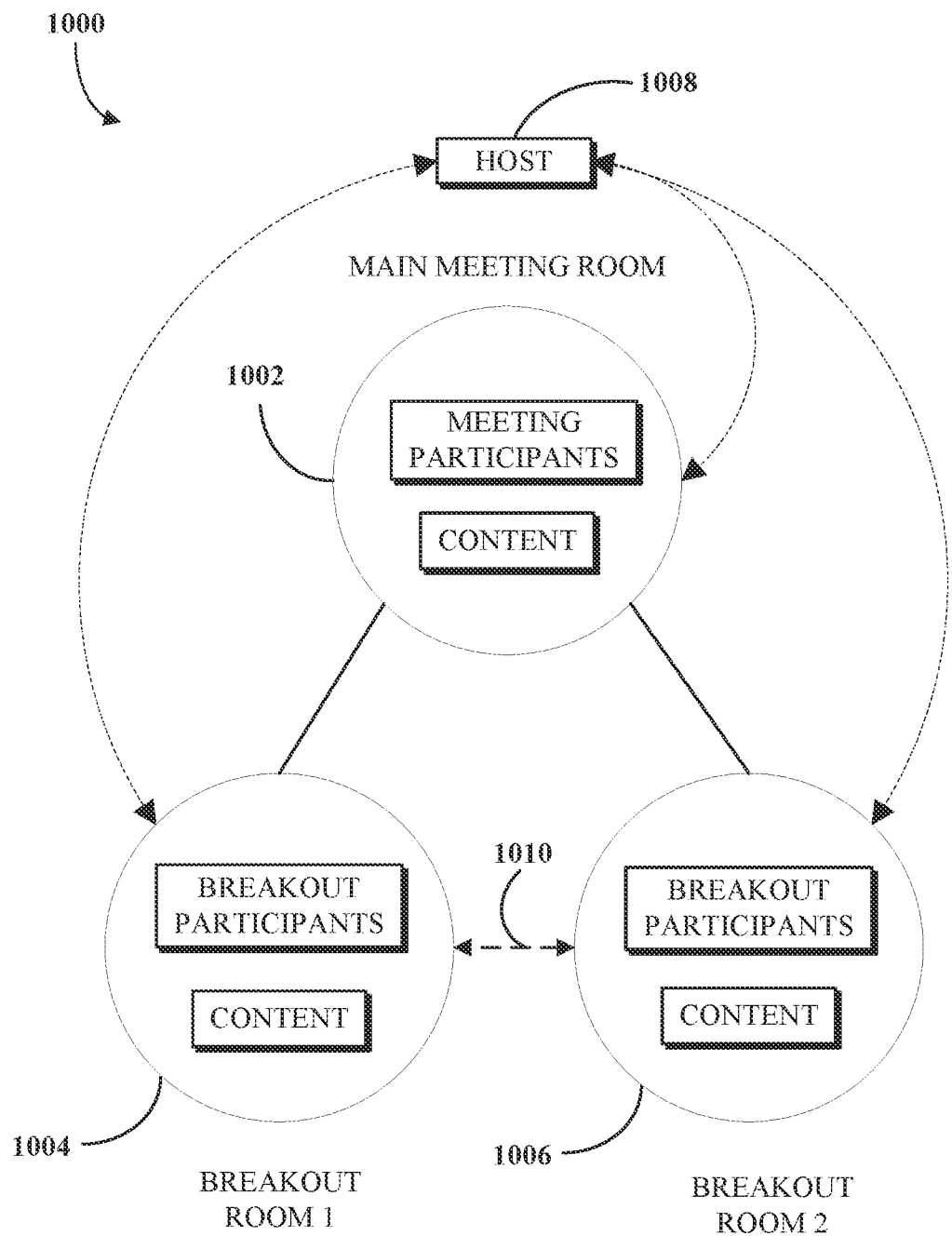
FIG. 10 is a block diagram of an example of a system in which a host controls breakout rooms to swap content between breakout rooms.

FIG. 10 is a block diagram of an example of a system 1000 in which a host controls breakout rooms to swap content between breakout rooms. The system 1000 can be executed using computing devices, such as the systems, hardware, and software described with respect to FIGS. 1-7. In the system 1000, a host can instantiate a main meeting room and multiple breakout rooms associated with the main meeting room, such as a main meeting room 1002 and breakout rooms 1004 and 1006. Each instantiated room includes a session identifier or address that allows conferencing software, such as the conferencing software 404 shown in FIG. 4, to organize the rooms, individually or in groups, and to associate or link the breakout rooms as sub-rooms to the main meeting room. As shown by dashed connections, the host, without joining a breakout room, can control communications in the breakout rooms, such as by transmitting content to breakout rooms and/or receiving content from breakout rooms through conferencing software, such as the conferencing software 404 shown in FIG. 4. Further, as shown in this example by reference numeral 1008, the host can instantiate the main meeting room and the multiple breakout rooms, and control communications in the main meeting room and the multiple breakout rooms, without joining any of the rooms as a participant.

Additionally, as shown by dashed connection 1010, the host can control communications in the breakout rooms 1004 and 1006 by swapping content between the breakout rooms through conferencing software. For example, the host can cause a first content, e.g., a first picture, page, slide, video, or other media, being shared to a screen or window in breakout room 1004 to be transmitted to breakout room 1006, while causing a second content, e.g., a second picture, page, slide, video, or other media, being shared to a screen or window in breakout room 1006 to be transmitted to breakout room 1004. Such communications may be transmitted, for example, through channels, or signaling paths, comprising network connections or pathways routing the communications between the participant devices, as controlled by the host device, such as through a server device, based on network addresses for each of the devices. The channels may be established, and communication routed, via the conferencing software. In some implementations, the host can dynamically swap content between breakout rooms, such as by a timer configured by the host device. Accordingly, the host can trade discussion topics between breakout rooms, and/or enable breakout rooms to benefit from the progress of other breakout rooms, without requiring the host to join a breakout room.

Figure 11:
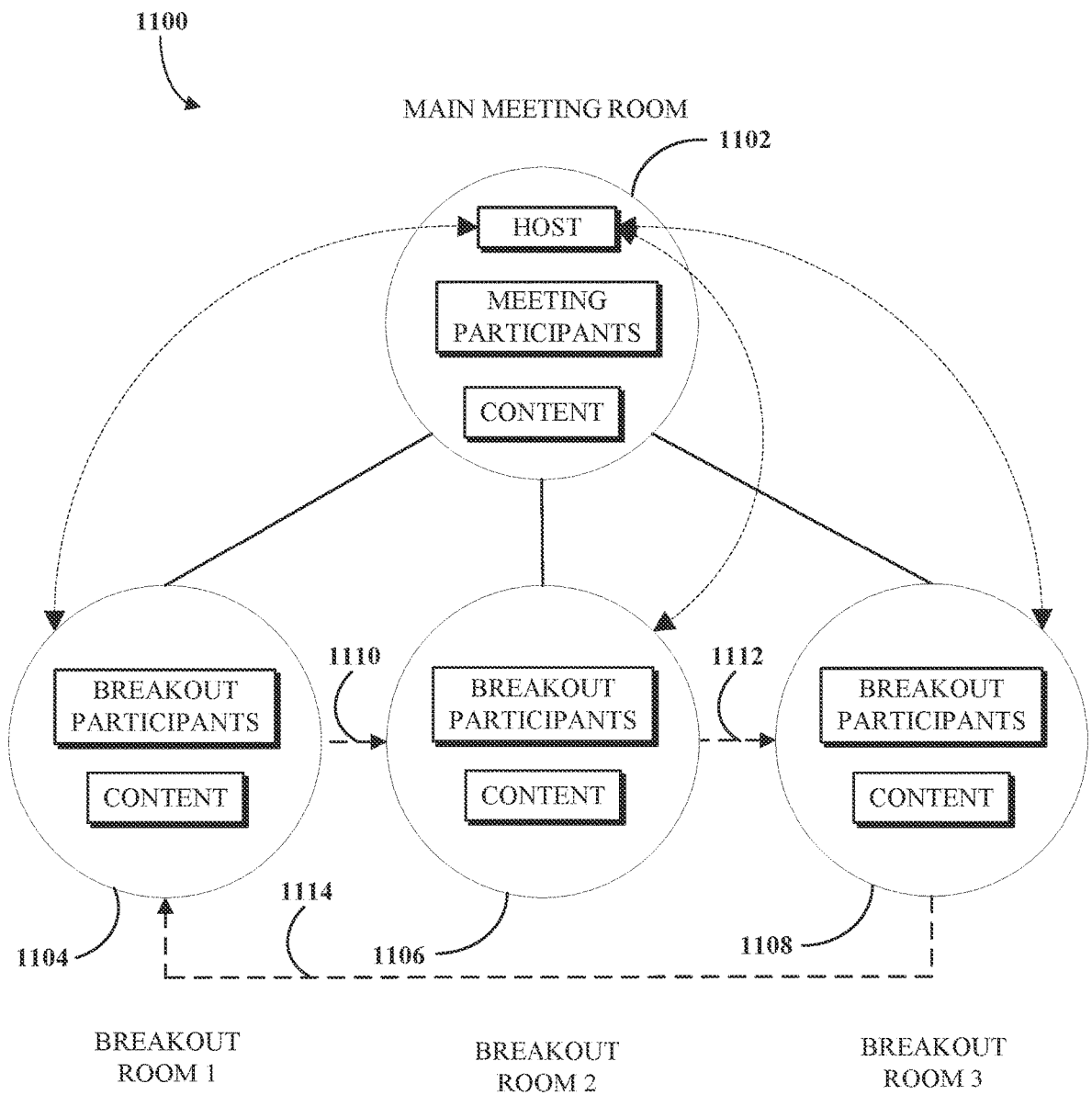
FIG. 11 is a block diagram of an example of a system in which a host controls breakout rooms to rotate content between breakout rooms.

FIG. 11 is a block diagram of an example of a system 1100 in which a host controls breakout rooms to rotate content between breakout rooms. The system 1100 can be executed using computing devices, such as the systems, hardware, and software described with respect to FIGS. 1-7. In the system 1100, a host can instantiate a main meeting room and multiple breakout rooms associated with the main meeting room, such as a main meeting room 1102 and breakout rooms 1104, 1106, and 1108. Each instantiated room includes a session identifier or address that allows conferencing software, such as the conferencing software 404 shown in FIG. 4, to organize the rooms, individually or in groups, and to associate or link the breakout rooms as sub-rooms to the main meeting room. As shown by dashed connections, the host, without joining a breakout room, can control communications in the breakout rooms, such as by transmitting content to breakout rooms and/or receiving content from breakout rooms through conferencing software, such as the conferencing software 404 shown in FIG. 4.

Additionally, as shown by dashed connections 1110, 1112, and 114, the host can control communications in the breakout rooms 1104, 1106, and 1108 by rotating content among the breakout rooms through the conferencing software. For example, the host can cause a first content, e.g., a first picture, page, slide, video, or other media, being shared to a screen or window in breakout room 1104, to be transmitted to breakout room 1106, while causing a second content, e.g., a second picture, page, slide, video, or other media, being shared to a screen or window in breakout room 1106, to be transmitted to breakout room 1108, while causing a third content, e.g., a third picture, page, slide, video, or other media, being shared to a screen or window in breakout room 1108, to be transmitted to breakout room 1104. Such communications may be shared, for example, through channels, or signaling paths, comprising network connections or pathways routing the communications between the participant devices, as controlled by the host device, such as through a server device, based on network addresses for each of the devices. The channels may be established, and communication routed, via the conferencing software. In some implementations, the host can dynamically rotate such content, such as by a timer configured by the host device. In some implementations, the host can rotate content according to a round robin scheme or another scheme. Accordingly, the host can rotate discussion topics among breakout rooms, and/or enable breakout rooms to benefit from the progress of other breakout rooms, without requiring the host to join a breakout room.

Figure 12:
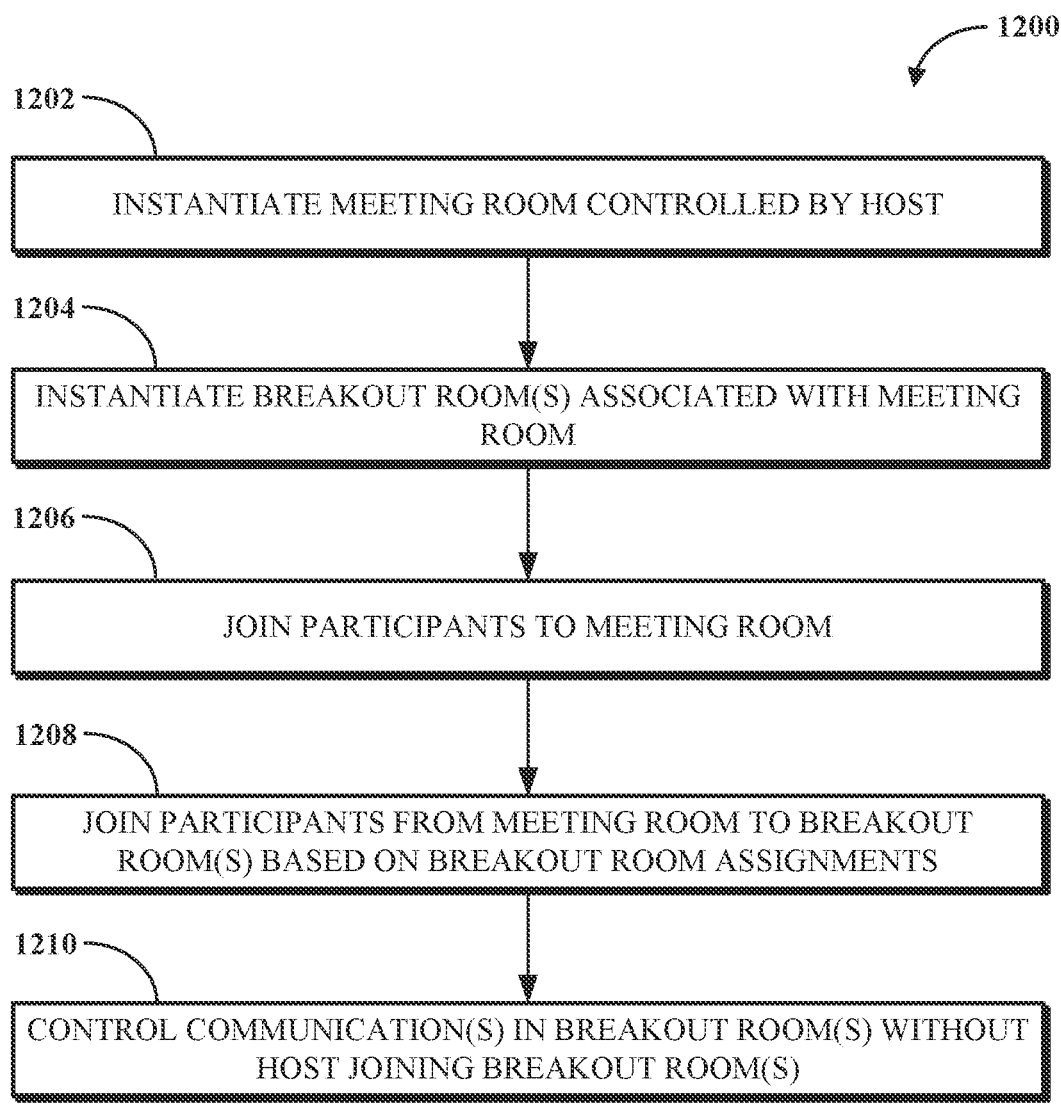
FIG. 12 is a flowchart of an example of a technique for allowing a host to control communication in a breakout room without requiring the host to join the breakout room.

To further describe some implementations in greater detail, reference is next made to examples of techniques which may be performed by or using a system providing moderator controls for breakout rooms. FIG. 12 is a flowchart of an example of a technique 1200 for allowing a host to control communication in a breakout room without requiring the host to join the breakout room. The technique 1200 can be executed using computing devices, such as the systems, hardware, and software described with respect to FIGS. 1-11. The technique 1200 can be performed, for example, by executing a machine-readable program or other computer-executable instructions, such as routines, instructions, programs, or other code. The steps, or operations, of the technique 1200 or another technique, method, process, or algorithm described in connection with the implementations disclosed herein can be implemented directly in hardware, firmware, software executed by hardware, circuitry, or a combination thereof.

For simplicity of explanation, the technique 1200 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1202, a host instantiates a main meeting room allowing communication among the host and meeting participants. The meeting room includes a session identifier or address for identifying the meeting. The meeting room is controlled by the host so that the host can selectively join participants to the meeting and control communication among participants in the meeting.

At 1204, the host instantiates one or more breakout rooms associated with the meeting room. Each breakout room includes a session identifier or address that allows organization of the breakout rooms and association or linking of the breakout rooms as sub-rooms to the meeting room. The host may divide the breakout rooms into groups or manage the breakout rooms individually.

At 1206, the host joins participants to the meeting room as meeting participants. Communication within the meeting room may be limited to the meeting participants in the meeting room. The host may join participants to the meeting room before or after instantiation of breakout rooms.

At 1208, the host joins meeting participants from the meeting room as breakout participants in the breakout rooms. Breakout participants may be assigned to breakout rooms automatically or manually or may be allowed to select and enter breakout rooms on their own. Communication within each breakout room may be limited to breakout participants in the breakout room. Communication in a breakout room may comprise sharing content, through the breakout room, such as an audio stream comprising communication among the participants; a screen or window displaying a picture, page, slide, video, or other media; chat messages; and the like.

At 1210, the host controls communication in the breakout rooms without the host being required to join a breakout room as a participant. The host can control communications in breakout rooms by transmitting and/or receiving content.

For example, the host can control communications in breakout rooms by receiving content, such as a real time audio stream comprising communication among the participants; a real time transcription of the audio stream; a screen or window displaying a picture, page, slide, video, or other media; chat messages; and the like, from breakout rooms. Also, the host can control communications in breakout rooms by transmitting content, such as broadcasting audio and/or video communications or messages to participants; transmitting a picture, page, slide, video, or other media to a screen or window being shared by participants; transmitting chat messages; and the like, to one or more of the breakout rooms. For example, the host can select the one or more breakout rooms with which to interact by controlling communication in one or more forms using a user interface control element available only to the host within conferencing software used to implement the meeting and the breakout rooms. In some implementations, the host can dynamically control communications in breakout rooms, such as by limiting an amount of time in which content is displayed to a screen or window being shared.

Some implementations may include a method that includes instantiating a meeting room controlled by a host. The meeting room may be configured to allow communication among the host and meeting participants. The method may include instantiating one or more breakout rooms associated with the meeting room. A communication within a breakout room may be limited to one or more of the meeting participants in the breakout room. The method may include allowing the host to control communication in the one or more breakout rooms without requiring the host to join the one or more breakout rooms. In one or more implementations, an audio stream from a breakout room of the one or more breakout rooms is output at a client device of the host to allow the host to control the communication in the breakout room. In one or more implementations, chat messages from a breakout room of the one or more breakout rooms are output at a client device of the host to allow the host to control the communication in the breakout room. In one or more implementations, a screen being shared in a breakout room of the one or more breakout rooms is output at a client device of the host to allow the host to control the communication in the breakout room. In one or more implementations, a screen being shared in a breakout room of the one or more breakout rooms is configured from a client device of the host to display content from the client device. In one or more implementations, a screen being shared in a breakout room of the one or more breakout rooms is limited by a timer configured by a client device of the host. In one or more implementations, an audio communication is configured from a client device of the host to broadcast to a breakout room of the one or more breakout rooms. In one or more implementations, the method may include allowing a breakout participant in a breakout room of the one or more breakout rooms to initiate content communication with the host from the breakout room. In one or more implementations, the method may include allowing the host to control a first communication in a first group of the one or more breakout rooms while controlling a second communication in a second group of the one or more breakout rooms. In one or more implementations, the method may include allowing the host to display content from a first screen being shared in a first breakout room to a second screen being shared in a second breakout room.

Some implementations may include an apparatus that includes a memory and a processor configured to execute instructions stored in the memory. The instructions may be executed by the processor to instantiate a meeting room controlled by a host. The meeting room may be configured to allow communication among the host and meeting participants. The instructions may be executed by the processor to instantiate one or more breakout rooms associated with the meeting room. A communication within a breakout room may be limited to one or more of the meeting participants in the breakout room. The instructions may be executed by the processor to allow the host to control communication in the one or more breakout rooms without requiring the host to join the one or more breakout rooms. In one or more implementations, the instructions may be executed by the processor to output, at a client device of the host, an audio stream from a breakout room of the one or more breakout rooms to allow the host to control the communication in the breakout room. In one or more implementations, the instructions may be executed by the processor to output, at a client device of the host, chat messages from a breakout room of the one or more breakout rooms to allow the host to control the communication in the breakout room. In one or more implementations, the instructions may be executed by the processor to output, at a client device of the host, a screen being shared in a breakout room of the one or more breakout rooms to allow the host to control the communication in the breakout room. In one or more implementations, the instructions may be executed by the processor to display content from a client device of the host to a screen being shared in a breakout room of the one or more breakout rooms. In one or more implementations, the instructions may be executed by the processor to allow the host to control a first communication in a first group of the one or more breakout rooms while controlling a second communication in a second group of the one or more breakout rooms.

Some implementations may include a non-transitory computer-readable storage device that includes program instructions. The program instructions may be executed by a processor that causes the processor to perform operations. The operations may include instantiating a meeting room controlled by a host. The meeting room may be configured to allow communication among the host and meeting participants. The operations may include instantiating one or more breakout rooms associated with the meeting room. A communication within a breakout room may be limited to one or more of the meeting participants in the breakout room. The operations may include allowing the host to control communication in the one or more breakout rooms without requiring the host to join the one or more breakout rooms. In one or more implementations, the operations may include outputting, at a client device of the host, an audio stream from a breakout room of the one or more breakout rooms to allow the host to control the communication in the breakout room. In one or more implementations, the operations may include outputting, at a client device of the host, chat messages from a breakout room of the one or more breakout rooms to allow the host to control the communication in the breakout room. In one or more implementations, the operations may include outputting, at a client device of the host, a screen being shared in a breakout room of the one or more breakout rooms to allow the host to control the communication in the breakout room.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   instantiating a meeting room controlled by a host, the meeting room configured to allow communication among the host and meeting participants;
   instantiating one or more breakout rooms associated with the meeting room, wherein a communication within a breakout room is limited to one or more of the meeting participants in the breakout room, and wherein host credentials allow the host to control the one or more breakout rooms by allowing the meeting participants to join the one or more breakout room with the meeting participants receiving visual indications of other meeting participants in the one or more breakout rooms; and
   controlling communication in the one or more breakout rooms, based on the host credentials, by transmitting content from the host when the host is in the meeting room to the one or more breakout rooms without requiring the host to leave the meeting room and join the one or more breakout rooms as an additional meeting participant and without the meeting participants in the one or more breakout rooms receiving a visual indication of the host in the one or more breakout rooms.

2. The method of claim 1, wherein an audio stream from a breakout room of the one or more breakout rooms is output at a client device of the host to allow the host to control the communication in the breakout room.

3. The method of claim 1, wherein chat messages from a breakout room of the one or more breakout rooms are output at a client device of the host to allow the host to control the communication in the breakout room.

4. The method of claim 1, wherein a screen being shared in a breakout room of the one or more breakout rooms is output at a client device of the host to allow the host to control the communication in the breakout room.

5. The method of claim 1, wherein a screen being shared in a breakout room of the one or more breakout rooms is configured from a client device of the host to display content from the client device.

6. The method of claim 1, wherein a screen being shared in a breakout room of the one or more breakout rooms is limited by a timer configured by a client device of the host.

7. The method of claim 1, wherein an audio communication is configured from a client device of the host to broadcast to a breakout room of the one or more breakout rooms.

8. The method of claim 1, comprising:
   allowing a breakout participant in a breakout room of the one or more breakout rooms to initiate content communication with the host from the breakout room.

9. The method of claim 1, comprising:
   allowing the host to control a first communication in a first group of the one or more breakout rooms while controlling a second communication in a second group of the one or more breakout rooms.

10. The method of claim 1, comprising:
    allowing the host to display content from a first screen being shared in a first breakout room to a second screen being shared in a second breakout room.

11. An apparatus, comprising:
    a memory; and
    a processor configured to execute instructions stored in the memory to:
    instantiate a meeting room controlled by a host, the meeting room configured to allow communication among the host and meeting participants;
    instantiate one or more breakout rooms associated with the meeting room, wherein a communication within a breakout room is limited to one or more of the meeting participants in the breakout room, and wherein host credentials allow the host to control the one or more breakout rooms by allowing the meeting participants to join the one or more breakout room with the meeting participants receiving visual indications of other meeting participants in the one or more breakout rooms; and control communication in the one or more breakout rooms, based on the host credentials, by transmitting content from the host when the host is in the meeting room, to the one or more breakout rooms without requiring the host to leave the meeting room and join the one or more breakout rooms as an additional meeting participant and without the meeting participants in the one or more breakout rooms receiving a visual indication of the host in the one or more breakout rooms.

12. The apparatus of claim 11, wherein the instructions include instructions to:

output, at a client device of the host, an audio stream from a breakout room of the one or more breakout rooms to allow the host to control the communication in the breakout room.

13. The apparatus of claim 11, wherein the instructions include instructions to:

output, at a client device of the host, chat messages from a breakout room of the one or more breakout rooms to allow the host to control the communication in the breakout room.

14. The apparatus of claim 11, wherein the instructions include instructions to:

output, at a client device of the host, a screen being shared in a breakout room of the one or more breakout rooms to allow the host to control the communication in the breakout room.

15. The apparatus of claim 11, wherein the instructions include instructions to:

to display content from a client device of the host to a screen being shared in a breakout room of the one or more breakout rooms.

16. The apparatus of claim 11, wherein the instructions include instructions to:

allow the host to control a first communication in a first group of the one or more breakout rooms while controlling a second communication in a second group of the one or more breakout rooms.

17. A non-transitory computer readable medium storing instructions operable to cause one or more processors to perform operations comprising:

instantiating a meeting room controlled by a host, the meeting room configured to allow communication among the host and meeting participants;

instantiating one or more breakout rooms associated with the meeting room, wherein a communication within a breakout room is limited to one or more of the meeting participants in the breakout room, and wherein host credentials allow the host to control the one or more breakout rooms by allowing the meeting participants to join the one or more breakout room with the meeting participants receiving visual indications of other meeting participants in the one or more breakout rooms; and controlling communication in the one or more breakout rooms, based on the host credentials, by transmitting content from the host when the host is in the meeting room to the one or more breakout rooms without requiring the host to leave the meeting room and join the one or more breakout rooms as an additional meeting participant and without the meeting participants in the one or more breakout rooms receiving a visual indication of the host in the one or more breakout rooms.

18. The non-transitory computer readable medium of claim 17, the operations comprising:

outputting, at a client device of the host, an audio stream from a breakout room of the one or more breakout rooms to allow the host to control the communication in the breakout room.

19. The non-transitory computer readable medium of claim 17, the operations comprising:

outputting, at a client device of the host, chat messages from a breakout room of the one or more breakout rooms to allow the host to control the communication in the breakout room.

20. The non-transitory computer readable medium of claim 17, the operations comprising:

outputting, at a client device of the host, a screen being shared in a breakout room of the one or more breakout rooms to allow the host to control the communication in the breakout room.

21. The method of claim 1, wherein transmitting content to the one or more breakout rooms comprises:

transmitting content to a first breakout room of the one or more breakout rooms without the host joining the first breakout room and without transmitting content to a second breakout room of the one or more breakout rooms.

22. The method of claim 1, wherein transmitting content to the one or more breakout rooms comprises:

forcing content to a screen being shared in a breakout room of the one or more breakout rooms without the host joining the breakout room.

* * * * *